United States Patent Office.

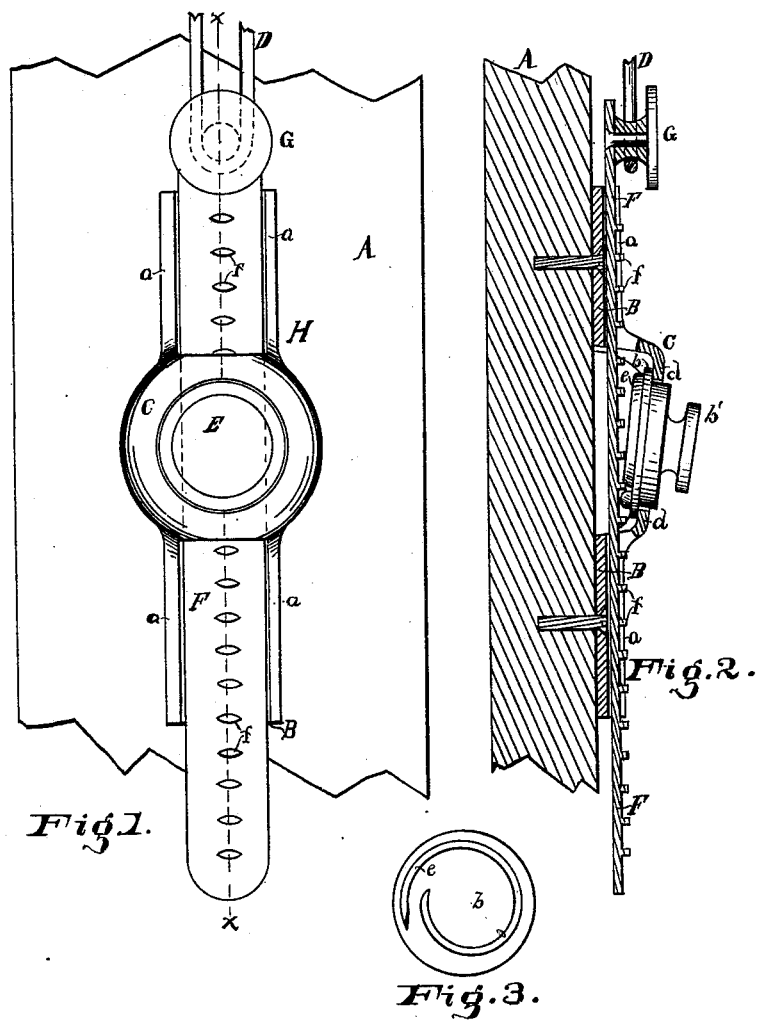

JOHN RANCEVAU, OF CINCINNATI, OHIO, ASSIGNOR OF ONE-HALF TO JOHN FULLER HASTINGS, OF SAME PLACE.

CURTAIN-CORD TIGHTENER.

SPECIFICATION forming part of Letters Patent No. 235,169, dated December 7, 1880.

Application filed April 26, 1880. (No model.)

*To all whom it may concern:*

Be it known that I, JOHN RANCEVAU, of the city of Cincinnati, Hamilton county, and State of Ohio, have invented certain new and useful Improvements in Curtain-Cord Fixtures, of which the following is a specification.

My invention relates to that class of curtain-fixtures in which a cord is used to raise and lower the curtain; and it consists of a device, more particularly hereinafter described, which is at once cheap, convenient, and durable.

Among the advantages connected with my improvement are the following, viz: The cord may be easily tightened or loosened, and when once it (my device) has been set so as to hold the cord taut it cannot afterward be moved out of such position, except by an intentional effort on the part of the operator.

In the drawings forming part of this specification, Figure 1 is a plan view of my device. Fig. 2 is a sectional view taken through the line $x\ x$ of Fig. 1. Fig. 3 is an inverted plan view of the screw device.

A represents a portion of a window-casing to which my device is attached.

H is the holder of the sliding bar, and is preferably constructed as follows, viz: B is the base-plate, which is screwed to the casing, and at either side is provided with forwardly-projecting flanges $a$, which flanges expand near the center and are continuous with the arch or box C. This box C is inclined as shown in Fig. 2, the purpose of which construction will be hereinafter explained. In the top of this arch C is a circular opening for the reception of the screw device E. This screw device consists of a base-plate, $b$, and a knob or head, $b'$, the base-plate being of somewhat larger diameter than the circular opening in the arch or box C, so that when the various elements of my invention are in position this base-plate $b$ will be prevented from passing through the opening by coming in contact with the flange $d$, extending around said opening. On the inner face of this base-plate $b$ is a worm or endless screw, $e$, or coil, as shown in Fig. 3.

F is a sliding bar, which fits between the flanges $a$ and passes under the arch or box C. To one end of this bar is attached a pulley or other suitable device, G—as, for example, a smooth stud—around which the cord D passes and with or upon which it moves. The outer face of this sliding bar F is provided with a series of studs or teeth, $f$, which form a rack, between the teeth of which the worm or screw $e$ passes. The arch or box C is inclined, as shown in Fig. 2, to allow only one portion of the worm to engage the teeth $f$, the teeth passing under the worm at the side opposite the engaging portion, as shown in said Fig. 2.

The operation of my invention, as will be understood from the foregoing description, is very simple. The head $b'$ of the screw device being turned, the worm or screw $e$, engaging with the teeth $f$, causes the sliding bar F to be lowered or raised, which tightens or loosens the cord as occasion requires, and this bar is held firmly in the position required.

It will be observed that there are no springs or other like devices in my invention to break or get out of repair, which is the objection urged to fixtures as ordinarily constructed.

It is also apparent that the rack of my device, when once set, cannot slip or move from position until the screw E is turned. In this respect my device has an advantage over many other curtain-fasteners, which are liable, after a little use, to continually slip, and are also subject to be deranged by an accidental blow from the arm or other portion of the person of one near the window.

It may be here remarked that the screw $e$ may be doubled when desired.

The mode of the connection of the inclined screw to the base-plate may be varied as convenience shall dictate, and the form of the device for rotating the screw may be changed at pleasure.

What I claim as new and of my invention, and desire to secure by Letters Patent, is—

1. The sliding bar F, provided with teeth and with the cord-holding device G, in combination with a slide-holder and an endless screw, $e$, inclined at an angle to the sliding bar, to allow only one portion of the screw to come in contact with said bar, substantially as and for the purposes specified.

2. The sliding bar F, provided with teeth and with the cord-holding device, in combination with a slide-holder having flanges $a$ and an endless screw inclined at an angle to the sliding bar, to allow only one portion of the screw to come in contact with said bar, substantially as and for the purposes specified.

3. The sliding bar F, provided with teeth and with the cord-holding device, in combination with a slide-holder having box C, and a screw device consisting of base-plate $b$, knob or head $b'$, and screw $e$, inclined at an angle to the sliding bar, substantially as and for the purposes specified.

4. The sliding bar F, provided with teeth and with a cord-holding device, in combination with a slide-holder having a suitable base-plate, flanges $a$, box C, and a screw device, consisting of base-plate $b$, knob or head $b'$, and screw $e$, inclined at an angle to the sliding bar, substantially as and for the purposes set forth.

JOHN RANCEVAU.

Witnesses:
E. R. HILL,
JNO. W. STREHLI.